(No Model.)
H. MITTELSDORF.
CONTROLLER HANDLE.
No. 531,052. Patented Dec. 18, 1894.
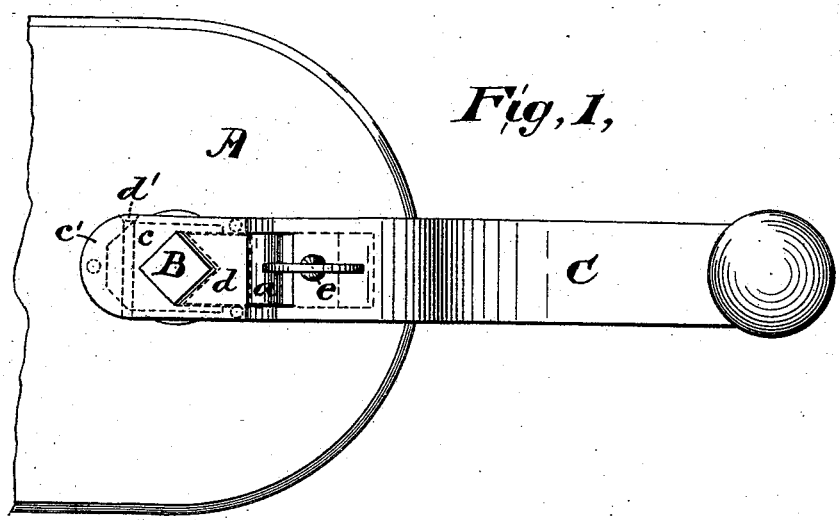
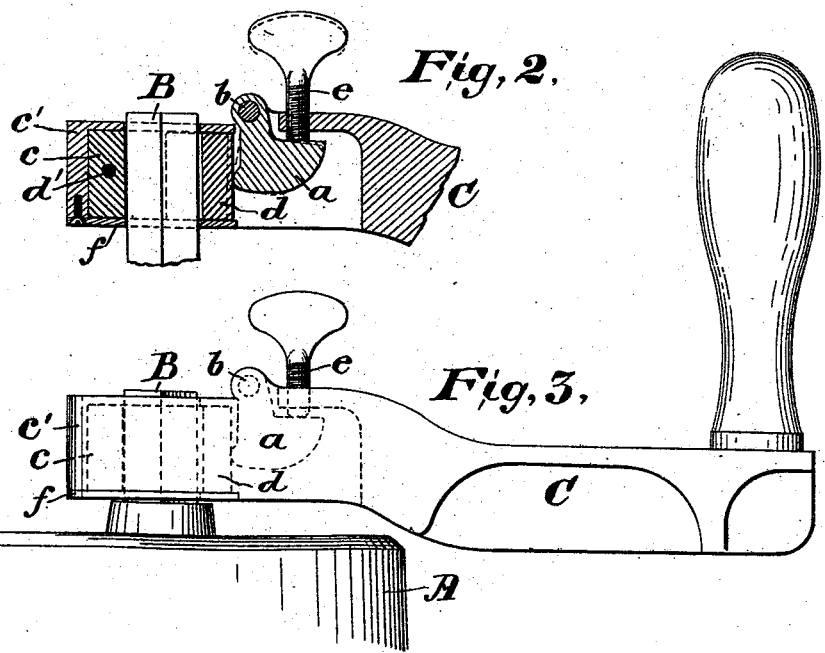

UNITED STATES PATENT OFFICE.

HENRY MITTELSDORF, OF ORANGE, NEW JERSEY.

CONTROLLER-HANDLE.

SPECIFICATION forming part of Letters Patent No. 531,052, dated December 18, 1894.

Application filed August 29, 1894. Serial No. 521,598. (No model.)

*To all whom it may concern:*

Be it known that I, HENRY MITTELSDORF, a citizen of the United States, residing at Orange, in the county of Essex and State of New Jersey, have invented certain new and useful Improvements in Controller-Handles for Electric Cars; and I do hereby declare the following to be a full, clear, and exact description of the invention, such as will enable others skilled in the art to which it appertains to make and use the same, reference being had to the accompanying drawings, and to letters of reference marked thereon, which form a part of this specification.
The object of this invention is to provide a handle for controllers for electric cars with means for securing said handle more securely and effectively upon the upper end of the controller shaft, so as to prevent its accidental detachment therefrom, and to secure other advantages hereinafter referred to.

The invention consists in the improved controller handle, and in the combination and arrangement of the parts thereof as herein set forth and finally pointed out in the claims.

Referring to the accompanying drawings, in which similar letters of reference indicate corresponding parts in each of the several figures, where they occur, Figure 1 represents a top plan view of a controller for electric cars and a handle attached to the vertical shaft thereof, embodying my improvement. Fig. 2 represents a vertical transverse section of a broken off portion of the improved handle, and exhibiting the working parts thereof, and Fig. 3 represents a side elevation of Fig. 1.

In said drawings, A, represents an ordinary controller casing, and B, the upper end of the vertical shaft thereof, the upper end of which is square, as shown.

In my improved handle, *a*, designates a cam pivoted at *b*, to the upper portion of said handle, which is chambered to receive said cam. One half of the socket, which fits upon the squared end of the shaft is formed in a block, *c*, of hardened steel fitted in the end, *c′*, of the handle, C, and the other half in one end of a follower, *d*, which is arranged to slide or work in a chamber formed in the handle, and which abuts, at the other end, against the cam *a*, as will be understood upon reference to the drawings. Said cam is operated to hold the follower firmly clamped against the shaft by means of a screw, *e*, which works in a threaded aperture in the top of the handle, as illustrated in the drawings. The follower *d*, is held in position by means of a plate, *f*, secured to the bottom of the handle, as indicated in Fig. 2, the block, *c*, being secured in position by a screw or pin, *d′*. Both the block and the follower should be made of hardened metal, and can be replaced, when worn out, by new ones, at slight expense, as will be obvious.

The operation of the device is as follows:—
The handle being adjusted upon the end of the shaft, it will be seen that the follower is set up firmly against said shaft by turning the screw inward against the cam until the handle is firmly clamped to the shaft, as will be obvious. As the socket or end of the shaft is worn away, and the handle gets loose by use, lost motion is taken up and the handle kept tight, by the operation of the screw upon the cam; the sharp end of the follower being filed off when necessary to permit the said follower to be tightened upon the end of the shaft, as will be readily understood.

Having thus described my invention, what I claim as new, and wish to secure by Letters Patent of the United States, is—

1. An improved controller handle for electric cars, combining therein a follower working in said handle, and adapted to fit against the angular sides of the controller shaft, a cam, as *a*, adapted to connect with said follower, and a screw, as *e*, adapted to engage with said cam and to force the latter against said follower, as described, and for the purpose set forth.

2. In a controller handle for electric cars, the combination of a block, as *c*, a follower, as *d*, a cam, as *a*, and means for operating the cam, as and for the purposes set forth.

In testimony that I claim the foregoing I have hereunto set my hand this 13th day of August, 1894.

HENRY MITTELSDORF.

Witnesses:
OLIVER DRAKE,
ROBERT SOLLBERGER.